United States Patent [19]

Kuroda et al.

[11] 4,345,042
[45] Aug. 17, 1982

[54] POLYURETHANE-MODIFIED POLYISOCYANURATE FOAM AND METHOD FOR PRODUCING THE SAME

[75] Inventors: Akira Kuroda, Funabashi; Tsutomu Nakamura, Shiraokamachi; Masatoshi Onishi, Yokohama, all of Japan

[73] Assignee: Hodogaya Chemical Co., Ltd., Tokyo, Japan

[21] Appl. No.: 241,439

[22] Filed: Mar. 6, 1981

[30] Foreign Application Priority Data

Mar. 21, 1980 [JP] Japan .................................. 55-34694

[51] Int. Cl.³ .............................................. C08G 18/14
[52] U.S. Cl. .................................... 521/112; 521/118; 521/125; 521/127; 521/129; 521/131; 521/159; 521/174
[58] Field of Search ............... 521/112, 118, 125, 127, 521/129, 131, 159, 174

[56] References Cited

U.S. PATENT DOCUMENTS 3,485,797  12/1969  Robins .................................. 526/71
3,948,824   4/1976  Robins .................................. 521/171

Primary Examiner—Maurice J. Welsh
Attorney, Agent, or Firm—Paul & Paul

[57] ABSTRACT

A polyurethane-modified polyisocyanurate foam having an excellent heat-resistance and flame-resistance and a reduced smoke-generation, comprises a reaction product of a mixture containing (A) at least one polyisocyanate compounds; (B) at least one polyol compound including, benzylic ether type phenolic resin of the formula (1):

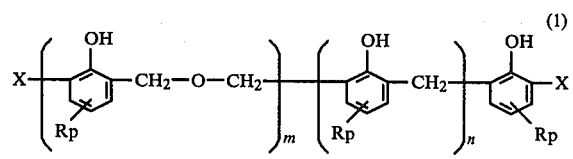

wherein R=H, hydrocarbon, oxyhydrocarbon or halogen, X=H or methylol, the molar ratio methylol/H≧1, m+n≧2 and m/m≧1; p=1∼3, (C) a trimerization catalyst, and; (D) a blowing agent, the ratio of the isocyanate equivalent of the isocyanate compound to the hydroxyl equivalent of the polyol compound being from 1.5 t 10.

14 Claims, No Drawings

POLYURETHANE-MODIFIED POLYISOCYANURATE FOAM AND METHOD FOR PRODUCING THE SAME

FIELD OF THE INVENTION

The present invention relates to a polyurethane-modified polyisocyanurate foam and a method for producing the same. More particularly, the present invention relates to a polyurethane-modified polyisocyanurate foam having not only an excellent heat-resistance and flame resistance, but also, a reduced friability and smoke-generating property, and a method for producing the same.

BACKGROUND OF THE INVENTION

It is known that conventional rigid polyurethane foam exhibits a low thermal conductivity and, therefore, is useful as a heat insulating material. However, since the rigid polyurethane foam exhibits an unsatisfactory heat resistance and flame resistance, it is impossible to utilize the conventional polyurethane foam as a heat insulating material to be used at an elevated temperature of, for example, 120° C. or more.

It is also known that conventional polyisocyanurate foam exhibits a satisfactory heat resistance and flame resistance. However, conventional polyisocyanurate foam has a higher friability than that of the conventional polyurethane foam. Therefore, it was desired to reduce the friability of the polyisocyanurate foam without decreasing the heat and flame resistances thereof. For this purpose, various types of polyurethane-modified polyisocyanurate foams were provided. In the conventional polyurethan-modified polyisocyanurate foams, it was successful to reduce the friability. However, the modification of the polyisocyanurate with conventional polyurethane caused the resultant foam to exhibit a decreased heat and flame resistance. Also, the conventional modification frequently caused the smoke-generation of the resultant foam to be undesirably enhanced.

U.S. Pat. No. 3,948,824 discloses a heat resistant foam comprising a polyurethane which is a reaction product of polyisocyanate and a benzylic ether type phenolic resin. However, the heat and flame resistance of the product of the U.S. Patent was still unsatisfactory.

BRIEF SUMMARY OF THE INVENTION

An object of the present invention is to provide a polyurethane-modified polyisocyanurate foam having not only an excellent heat resistance and flame resistance, but also, a reduced friability and a decreased smoke-generation, and a method for producing the same.

The above-mentioned object can be attained by the polyurethane-modified polyisocyanurate foam of the present invention which comprises a reaction product of a mixture containing:

(A) a polyisocyanate component consisting of at least one polyisocyanate compound;

(B) a polyol component containing at least one benzylic ether type phenolic resin of the formula (1):

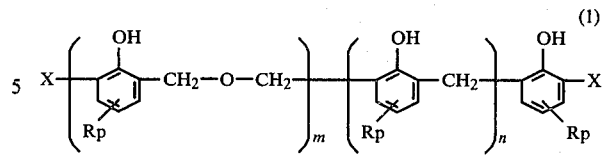

wherein R represents a member selected from the group consisting of a hydrogen atom, hydrocarbon radicals, oxyhydrocarbon radicals and halogen atoms; X represents a terminal group selected from the group consisting of a hydrogen atom and methylol radical, the molar ratio of the methylol terminal group to the hydrogen terminal group being at least 1; and m and n represent an integer, respectively, the sum of m and n being at least 2 and the ratio of m to n being at least 1, and p represents an integer from 1 to 3;

(C) a catalyst for trimerizing said polyisocyanate compound, and;

(D) a blowing agent, the ratio of the amount in isocyanate equivalent of the polyisocyanate component to the amount in hydroxyl equivalent of the polyol component, being in the range of from 1.5 to 10.

This type of polyurethane-modified polyisocyanurate foam is new and was not disclosed by any prior arts as far as the inventors of the present invention know.

The above-mentioned polyurethane-modified polyisocyanurate foam can be produced by the method of the present invention comprising the steps of:

(1) uniformly mixing:

(B) a polyol component containing at least one benzylic ether type phenolic resin of the formula (1):

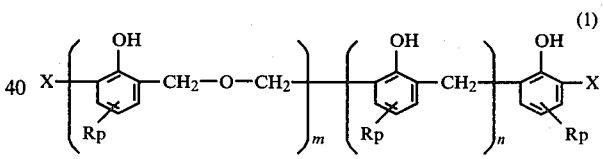

wherein R represents a member selected from the group consisting of a hydrogen atom, hydrocarbon radicals, oxyhydrocarbon radicals and halogen atoms; X represents a terminal group selected from the group consisting of a hydrogen atom and methylol radical, the molar ratio of the methylol terminal group to the hydrogen terminal group being at least 1; and m and n represent an integer, respectively, the sum of m and n being at least 2 and the ratio of m to n being at least 1, and p represents an integer from 1 to 3;

(C) a catalyst for trimerizing said polyisocyanate compound, and;

(D) a blowing agent, the ratio of the amount in isocyanato equivalent of the polyisocyanate component to the amount in hydroxyl equivalent of the polyol component, being in the range of from 1.5 to 10.

(2) admixing the mixture with (A) a polyisocyanate component consisting of at least one polyisocyanate compound while vigorously stirring the admixture at an ambient temperature, to prepare a creamy admixture, and finally, (3) leaving the creamy admixture to stand at a predetermined temperature without stirring it to cause said creamy admixture to be foamed in two foaming steps and, then, solidified.

DETAILED DESCRIPTION OF THE INVENTION

In the polyurethane-modified polyisocyanurate foam of the present invention, the cellular material of the foam consists of a reaction material of a polyisocyanate component with a polyol component in the presence of a trimerization catalyst for the polyisocyanate component, the ratio of the isocyanate equivalent of the polyisocyanate component to the hydroxyl equivalent of the polyol component being in the range of from 1.5 to 10, preferably, from 3 to 7.

The polyisocyanate component consists of at least one polyisocyanate compound. Usually, the polyisocyanate compound usable for the present invention may be selected from the group consisting of aliphatic, cycloaliphatic and aromatic polyisocyanates, as long as they are useful for producing conventional polyurethane and polyisocyanurate resins. Also, the polyisocyanate compound may be selected from prepolymers of at least one above-mentioned polyisocyanate, preferably, in an excess amount, with at least one hydroxyl compound.

The polyisocyanate compound may be hexamethylene diisocyanate, 4,4'-dicyclohexylmethane diisocyanate, 2,4- or 2,6-tolylene diisocyanate, 4,4'-diphenylmethane diisocyanate, or triphenyl methane triisocyanate. The 4,4'-diphenylmethane diisocyanate which may be of a crude grade, is a preferably polyisocyanate for the present invention, because it results in excellent heat and flame resistance of the resultant foam.

The polyol component usable for the present invention contains at least one benzylic ether type phenolic resin of the formula (1):

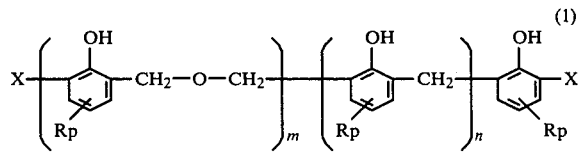

wherein R represents a member selected from the group consisting of a hydrogen atom, hydrocarbon radicals, oxyhydrocarbon radicals and halogen atoms; X represents a terminal group selected from the group consisting of a hydrogen atom and methylol radical, the molar ratio of the methylol terminal group to the hydrogen terminal group being at least one, and m and n represent an integer, respectively, the sum of m and n being at least 2 and the ratio of m to n being at least 1, and p represents an integer from 1 to 3.

The benzylic ether type phenolic resin of the formula (1) can be prepared by the method as disclosed in U.S. Pat. No. 3,485,797. That is, the benzylic ether type phenolic resin can be prepared by condensing a phenol compound of the formula (2):

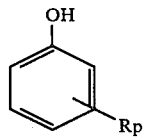

wherein R and p are the same as defined hereinbefore, and located meta or para to the phenolic hydroxyl group, with formaldehyde in a molar ratio of the phenol compound to formaldehyde of from 1:1 to 1:3, in the presence of a catalyst consisting of a divalent metal salt.

In the formulae (1) and (2), R may be a hydrogen atom, a hydrocarbon radical, for example, methyl, ethyl, butyl or octyl, a oxyhydrocarbon radical, for example, methoxy, ethoxy, butoxy, a halogen atom, for example, chlorine, bromine or fluorine.

In the polyol component usable for the present invention, it is important that the polyol component contains, preferably, at least 20% by weight, more preferably, at least 50% by weight, of at least one benzylic ether type phenolic resin of the formula (1). That is, the polyol component may consist of at least one benzylic ether type phenolic resin alone. Otherwise, the polyol component may consist of a mixture of 20% by weight or more, preferably, 50% by weight or more, of at least one benzylic ether type phenolic resin of the formula (1) and 80% by weight or less, preferably, 50% by weight or less, of at least one other polyol compound which can be used for producing conventional polyurethane resins. The other polyol compound may be selected from the group consisting of dihydric alcohol compounds, for example, ethylene glycol, diethylene glycol neopentyl glycol, 1,4-butane diol, 1,6-hexane diol and 1,4-cyclohexane dimethanol; trihydric alcohols and other polyols, for example, glycerol, trimethylolpropane, tris(2-hydroxyethyl) isocyanurate and pentaerythritol; polyesterpolyols and polyetherpolyols derived from the above-mentioned compounds, and; addition products of aromatic polyamines or bis-phenol A with alkylene oxides.

In the present invention, it is important that the ratio of the amount of the polyisocyanate component expressed by isocyanato equivalent (NCO) to the amount of the polyol component expressed by hydroxyl equivalent (OH) is in the range of from 1.5 to 10, preferably, from 3 to 7. The above-mentioned ratio will be referred to as "NCO/OH equivalent ratio" hereinafter. When the NCO/OH equivalent ratio is less than 1.5, since the polyisocyanate component is unsatisfactorily trimerized, the resultant foam has friable surface layers thereof, and exhibits an undesirably high smoke-generating property. Also, when the NCO/OH equivalent ratio is more than 10, since the polyisocyanate component is excessively trimerized, the resultant foam exhibits a high friability, a poor heat resistance and a high smoke-generating property.

The polyurethane-modified polyisocyanurate foam of the invention can be obtained by using a trimerization catalyst. The trimerization catalyst usable for the present invention can be selected from conventional polyisocyanate-trimerization catalysts. That is, the trimerization catalyst may consist of at least one member selected from the group consisting of alkali salts of aliphatic, cycloaliphatic and aromatic carboxylic acids, for example, potassium acetate, potassium formate and potassium propionate, 2,4,6-tris(dimethylaminomethyl)-phenol, N,N',N''-tris(dimethylaminopropyl)hexahydrotriazine and diaza-bis-cycloalkene.

The trimerization catalyst is used in an amount of from 0.1 to 10% based on the sum of the weights of the polyisocyanate component and the polyol component.

In the preparation of the polyurethane-modified polyisocyanurate foam of the present invention, the reaction mixture may additionally contain a reaction promotor. The reaction promotor may consist of dibutyl-tin-dilaurate.

The polyurethane-modified polyisocyanurate foam of the present invention can be prepared by using a blowing agent which can generate a foaming gas simultaneously with the reaction of the polyisocyanate component with the polyol component. The blowing agent may consist of at least one compound which is usable as a blowing agent for conventional polyurethane and polyisocyanurate foams. The blowing agent may be selected from the group consisting of trichloromonofluoromethane, dichlorodifluoromethane and methylene chloride.

The blowing agent may contain a certain type of compounds capable of producing carbon dioxide gas when any one of them react with the polyisocyanate. This type of compound may be water.

The blowing agent is used in a necessary amount for obtaining a desired density of the foam.

The polyurethane-modified polyisocyanurate foam of the present invention may be prepared from a reaction mixture containing a surfactant for controlling the size of the foams and stabilizing the resultant foams, in addition to the polyisocyanate component, the polyol component, the trimerization catalyst and the blowing agent. The surfactant may consist of at least one member selected from the group consisting of polydimethylsiloxane-polyalkyleneoxide block polymers and vinylsilane-polyoxyalkylene polyol copolymers.

The surfactant is usually used in an amount of from 0.2 to 5% based on the sum of the weights of the polyisocyanate component and the polyol component.

The polyurethane-modified polyisocyanurate foam of the present invention may contain one or more additives, for example, inorganic filler, for example, aluminium hydroxyd, pigment and flame-retardant, which are usually used for conventional polyurethane and polyisocyanurate foams.

In the method of the present invention, a mixture is prepared from a polyol component, a trimerization catalyst, a blowing agent and, optionally, a surfactant, a reaction promotor, and another additive. The mixture is admixed with a polyisocyanate component while vigorously stirring the admixture at an ambient temperature. As a result, a creamy admixture is obtained. Finally, the creamy admixture is left to stand at a predetermined temperature, for example, from 10° to 50° C., without stirring it so as to cause the creamy admixture to be foamed in two foaming steps and, then, solidified.

That is, the creamy admixture is primarily foamed while the polyurethane-forming reaction between the polyol component and the polyisocyanate compound is carried out and, then, the resultant primary foam is secondarily foamed while the trimerization reaction of the polyisoxyanate compound is taking place. Finally, the resultant foam is solidified. The formation of the creamy admixture is completed within a cream time of from several seconds to several tens of seconds. The term "cream time"0 used herein refers to a period of time of from the start of the stirring operation applied to the admixture to the completion of the creamy admixture formation. Also, the procedure consisting of the creamy admixture formation and the primary foaming, the secondary foaming and the solidification of the creamy admixture, is completed within a rise time of from several tens of seconds to several minutes. The term "rise time" used herein refers to a period of time of from the start of the stirring operation applied to the admixture to the completion of the solidification of the resultant foam.

The polyurethane-modified polyisocyanurate foam exhibits an excellent heat resistance and flame resistance, because the cellular material in the foam contains the heat and flame resistant polyisocyanurate structure and the polyisocyanurate structure is modified with the heat and flame resistant benzylic ether type phenolic resin. Also, the modification of the polyisocyanurate structure with the benzylic ether type phenolic resin causes the resultant foam to exhibit an reduced friability, that is, a reduced brittleness, and a reduced smoke-generation, when it is burnt.

Therefore, the polyurethane-modified polyisocyanurate foam is usable as a semi-incombustible material having a second class of flame resistance estimated in accordance with the combustion test of Japanese Industrial Standard (JIS) A 1321. Therefore, the polyurethane-modified polyisocyanurate foam of the present invention is useful for uses in which the foam is required to exhibit an excellent heat and flame resistance and a reduced smoke-generating property when it is burnt. For example, foam articles of the present invention may be a lining of a pipe line for conveying a fluid material having an elevated temperature, a heat insulating lining of a furnace or tank for treating or storing a material having an elevated temperature. Also, the foam of the present invention may be used as a component layer for various laminate materials containing a steel sheet, an aluminium sheet or an asbestos sheet as a surface layer thereof.

SPECIFIC EXAMPLES OF THE INVENTION

The features and advantages of the present invention will be further illustrated by the examples set forth below. However, the examples are only illustrative and should in no way be interpreted as limiting the scope of the present invention.

In the examples, the component materials used were as follows.

1. Polyisocyanate component (1) Polyisocyanate A: This was a crude 4,4'-diphenylmethane diisocyanate containing from 30.5 to 31.5% by weight of isocyanate (NCO) group.

(2) Polyisocyanate B: This was a prepolymer of a crude 4,4'-diphenylmethane diisocyanate with a polyoxyalkylene glycol, containing from 27 to 29% by weight of isocyanate (NCO) group.

2. Polyol component (1) Benzylic ether type phenolic resin: This was prepared in accordance with the method as disclosed in U.S. Pat. No. 3,485,797.

(2) Another polyol compound:

Polyol A: An addition product of an aromatic polyamine with a propylene oxide, having a hydroxyl value of 400 and produced and sold by Nippon Polyurethane Industry K.K. under their trademark "Polyol C".

Polyol B: Polyoxypropylene glycol having a hydroxyl value of 280 and produced and sold by Nippon Oil and Fat K.K., under their trademark "Uniol D-400".

Polyol C: An addition product of bisphenol A with a propylene oxide, having a hydroxyl value of 282 and produced and sold by Nippon Oil and Fat K.K. under their trademark "Uniol DB-400".

Polyol D: A polyesterpolyol derived from propylene glycol, glycerol, adipic acid and phthalic anhydride, having a hydroxyl value of 250 and produced and sold by Nippon Polyurethane Industry K.K. under their trademark "Nippolan N-111".

Polyol E: An addition product of a toluylene diamine with a propylene oxide, having a hydroxyl value of 500 and produced and sold by Nippon Polyurethane Industry K.K. under their trademark "Dultrack-80".

Polyol F: A polyoxyethylene-propylene glycol having a hydroxyl value of 50 and produced and sold by Asahi Denka Kogyo K.K. under their trademark "Adekapolyether CM-211".

3. Trimerization catalyst

Catalyst A: A solution of 50% by weight of potassium acetate in ethylene glycol.

4. Reaction Promotor

Promotor B: Dibutyl-tin-dilaurate

In the Examples, the test methods used were as follows.

1. Compression strength (kg/cm$^2$) was measured by compressing a specimen (50×50×50 mm) in a vertical direction so as to deduct 10% of the original volume of the specimen from the original volume.

2. Expansion (%) in dry condition was measured in such a manner that the specimen was heated in dry atmosphere at a temperature of 120° C. for 48 hours, and, thereafter, the expansion of the specimen in a horizontal direction was measured.

3. Expansion (%) in humid condition was measured in such a manner that the specimen was heated in a humid atmosphere having a temperature of 60° C. and a relative humidity of 95% for 48 hours, and, thereafter, an expansion (%) of the specimen in a horizontal direction was measured.

4. Flame resistance: The combustion time (second) and the combustion length (mm) of the specimen were measured in accordance with ASTM D 1692. Also, the coefficient of smoke-generation ($C_A$), the flame-retaining time and the ratio of the weight of the combustion tested specimen to the original weight of the specimen, were measured in accordance with JIS A-1321. Furthermore, after the combustion test, it was observed how the specimen was cracked and deformed.

EXAMPLE 1

A benzylic ethyl type phenolic resin was prepared in accordance with the method described in Example 3 of U.S. Pat. No. 3,485,797. The resultant phenolic resin had a hydroxyl value of 535 and a viscosity of 36,000 cps at a temperature of 25° C.

A polyethylene beaker having a capacity of two liters was charged with 58.1 g of the phenolic resin, 24.9 g of Polyol A, 16.6 g of Polyol B, 4.1 g of a surfactant made and sold by Toray Silicone K.K., under their trademark "Toray Silicone SH-193," 6.6 g of Catalyst A and 81.5 g of trichloromonofluoromethane. The above-mentioned materials were uniformly mixed in the beaker. Next, the mixture was admixed with 447.5 g of Polyisocyanate A, and the admixture was vigorously stirred at a temperature of 15° C. by using a mixer at a rotation velocity of 4000 to 4500 rpm for 5 seconds. The stirred admixture was placed in an aluminium mold box which had been heated to a temperature of 40° C. and the top of which was open so as to allow the admixture to secondarily foam and solidify. The cream time and the rise time were 10 seconds and 70 seconds, respectively. The density of the resultant polyurethane-modified polyisocyanurate foam was 30.5 kg/m$^3$. Other properties of the foam are indicated in Table 1.

EXAMPLE 2

The same procedures as those described in Example 1 were carried out, except that the mixture in the beaker was prepared from 33.6 g of the benzylic ether type phenolic resin, 14.3 g of Polyol A, 9.5 g of Polyol B, 2.4 g of Polyol F, 2.4 g of the surfactant 4.5 g of Catalyst A, 94.0 g of trichloromonofluoromethane, and 486.1 g of Polyisocyanate A was admixed with the mixture. The cream time and the rinse time were 11 seconds and 100 seconds, respectively. The density of the resultant foam was 31.0 kg/m$^3$. Other properties of the foam are indicated in Table 1.

EXAMPLE 3

The same procedures as those described in Example 1 were carried out except that the mixture in the beaker was prepared from 26.6 g of the benzylic ether type phenolic resin, 11.4 g of Polyol A, 7.6 g of Polyol B, 2.1 g of Polyol F, 1.9 g of the surfactant, 4.2 g of Catalyst A and 95.8 g of trichloromonofluoromethane and 509.3 g of Polyisocyanate A were admixed with the mixture. In the preparation of the polyurethane-modified polyisocyanurate foam, the cream time and the rise time were 17 seconds and 120 seconds, respectively. The foam exhibited a density of 30.9 kg/m$^3$. Other properties of the foam are indicated in Table 1.

EXAMPLE 4

The same procedures as those described in Example 1 were carried out except that the mixture in the beaker was prepared from 42.0 g of the benzylic ether type phenolic resin, 8.4 g of Polyol A, 12.6 g of Polyol B, 2.1 g of Polyol F, 2.1 g of the surfactant, 4.2 g of Catalyst A and 102 g trichloromonofluoromethane and 474.6 g of Polyisocyanate B were admixed with the mixture. In the preparation of the polyurethane-modified polyisocyanurate foam, the cream time and the rise time were 14 seconds and 100 seconds, respectively. The foam exhibited a density of 30.4 kg/m$^3$. Other properties of the foam are indicated in Table 1.

EXAMPLE 5

The same procedures as those described in Example 1 were carried out except that the mixture in the beaker was prepared from 29.4 g of the benzylic ether type phenolic resin, 21.0 g of Polyol C, 2.1 g of Polyol F, 2.1 g of the surfactant 4.2 g of Catalyst A and 102 g of trichloromonofluoromethane and 406.5 g of Polyisocyanate B were admixed with the mixture. In the preparation of the polyurethane-modified polyisocyanurate foam, the cream time and the rise time were 10 seconds and 95 seconds, respectively. The foam exhibited a density of 30.4 kg/m$^3$. Other properties of the foam are indicated in Table 1.

EXAMPLE 6

The same procedures as those described in Example 1 were carried out except that the mixture in the beaker was prepared from 42.0 g of the benzylic ether type phenolic resin, 8.4 g of Polyol A, 12.6 g of Polyol B, 2.1 g of Polyol F, 2.1 g of the surfactant, 2.1 g of Catalyst A, 2.1 g of Promotor B and 102 g of trichloromonofluoromethane and 474.6 g of Polyisocyanate B were admixed with the mixture. In the preparation of the polyurethane-modified polyisocyanurate foam, the cream time and the rise time were 10 seconds and 85 second, respectively. The foam exhibited a density of 31.0 kg/m$^3$. Other properties of the foam are indicated in Table 1.

EXAMPLE 7

The same procedures as those described in Example 1 were carried out except that the mixture in the beaker was prepared from 50.0 g of a benzylic ether type phenolic resin which, had been prepared by the method disclosed in Example 10 of U.S. Pat. No. 3,485,797, 1.5 g of the surfactant, 5.0 g of Catalyst A and 96.6 g of trichloromonofluoromethane and 509.9 g of Polyisocyanate B were admixed with the mixture. In the preparation of the polyurethane-modified polyisocyanurate foam, the cream line and the rise time were 11 seconds and 114 seconds, respectively. The foam exhibited a density of 30.2 kg/m$^3$. Other properties of the foam are indicated in Table 1.

COMPARATIVE EXAMPLE 1

The same procedures as those described in Example 1 were carried out except that the mixture in the beaker was prepared from 231.6 g of the benzylic ether type phenolic resin, 6.9 g of the foam stabilizer, 0.7 g of triethyl amine (polyurethane-foaming catalyst) and 67.2 g of trichloromonofluoromethane and 343.5 g of Polyisocyanate A were admixed with the mixture. In this case, the NCO/OH equivalent ratio was 1.05, and no trimerization catalyst was used. In the preparation of the polyurethane-foam, the cream time and the rise time were 35 seconds and 90 seconds, respectively. The foam exhibited a density of 32.5 kg/m$^3$. Other properties of the foam are indicated in Table 1.

COMPARATIVE EXAMPLE 2

The same procedures as those described in Example 1 were carried out except that the mixture in the beaker was prepared from 206.7 g of the benzylic ether type phenolic resin, 6.2 g of the surfactant, 4.1 g of Catalyst A and 107.9 g of trichloromonofluoromethane and 323.4 g of Polyisocyanate A were admixed with the mixture. In this case, the NCO/OH equivalent ratio was 1.05. In the preparation of the polyurethane-foam, the cream time and the rise time were 20 seconds and 65 seconds, respectively. The foam exhibited a density of 30.1 kg/m$^3$. Other properties of the foam are indicated in Table 1.

COMPARATIVE EXAMPLE 3

The same procedures as those described in Example 1 were carried out except that the mixture in the beaker was prepared from 46.7 g of Polyol D, 36.9 g of Polyol E, 16.4 g of Polyol F, 40.9 g of a flame-retardant consisting of tris-($\beta$-chloropropyl)-phosphate and made and sold by stonfur under their trademark "Fairol PCF", 3.3 g of the surfactant 4.0 g of Catalyst A and 92.2 g of trichloromonofluoromethane and 409.5 g of Polyisocyanate A were admixed with the mixture. In this case, no benzylic ether type phenolic resin was used. In the preparation of the polyurethane-modified polyisocyanurate foam, the cream time and the rise time were 20 seconds and 100 seconds, respectively. The foam exhibited a density of 31.0 kg/m$^3$. Other properties of the foam are indicated in Table 1.

TABLE 1

| | | Example No. | | | | | | | | | |
|---|---|---|---|---|---|---|---|---|---|---|---|
| | | Example | | | | | | | Comparative Example | | |
| | | 1 | 2 | 3 | 4 | 5 | 6 | 7 | 1 | 2 | 3 |
| NCO/OH equivalent ratio | | 3.0 | 5.5 | 7.0 | 5.5 | 5.5 | 5.5 | 5.5 | 1.05 | 1.05 | 4.7 |
| Foam Density (kg/m$^3$) | | 30.5 | 31.0 | 30.9 | 30.4 | 30.4 | 31.0 | 30.2 | 32.5 | 30.1 | 31.0 |
| Compression Strength (kg/cm$^2$) | | 2.08 | 1.98 | 1.95 | 2.05 | 1.97 | 2.11 | 1.90 | 2.45 | 2.20 | 2.00 |
| Thickness of friable surface layer (mm) | | 0 | 0 | 0 | 0 | 0 | 0 | 0 | 10 | 5 | 0 |
| Expansion (%) | Dry atmosphere | 1.7 | 2.3 | 2.5 | 2.5 | 2.4 | 2.3 | 2.0 | 3.5 | 3.2 | 3.0 |
| | Humid atmosphere | 2.9 | 2.8 | 2.8 | 2.6 | 2.7 | 2.7 | 2.7 | 2.5 | 2.4 | 3.6 |
| Flame resistance tested by ASTM D1692 | Combustion time (sec) | 36 | 36 | 35 | 35 | 34 | 35 | 35 | 45 | 43 | 45 |
| | Combustion length (mm) | 17 | 17 | 18 | 17 | 17 | 17 | 16 | 25 | 22 | 18 |
| Flame resistance tested by JIS A-1321 | Coefficient of smoke emitting ($C_A$) | 41 | 35 | 35 | 34 | 36 | 35 | 35 | 78 | 72 | 85 |
| | Flame-retaining time (sec) | 0 | 0 | 0 | 0 | 0 | 0 | 0 | 14 | 18 | 10 |
| | Weight ratio $\frac{\text{Combustion tested specimen}}{\text{original specimen}}$ (%) | 45 | 48 | 55 | 51 | 52 | 51 | 50 | 36 | 37 | 37 |
| | Cracks and deformation | none | none | none | none | none | none | none | Remarkable | Remarkable | slight |

From Table 1, it is clear that all the polyurethane-modified polyisocyanurate foam prepared in Examples 1 through 7 in accordance with the present invention exhibited a satisfactory compression strength, small expansion and an excellent flame resistance, and had no friable surface layer. Also, Table 1 clearly shows that in Comparative Example 1, the NCO/OH equivalent ratio smaller than 1.5 and not using the trimerization catalyst caused the resultant foam to have a thick friable surface layer 10 mm thick and to exhibit a poorer flame resistance than class 2 flame resistance defined by JIS A-1321. In Comparative Example 2, the NCO/OH equivalent ratio smaller than 1.5 caused the resultant foam to have a friable surface layer 5 mm thick and to exhibit a poor flame resistance. Furthermore, in Comparative Example 3, the absence of the benzylic ether type phenolic resin caused the resultant foam to exhibit a poor flame resistance, in spite of the fact that the conventional flame retardant was contained in the foam. Especially, the foam exhibited a poor dimensional stability in the humid atmosphere and an undesirably high smoke-generation. Therefore, the foams prepared in Comparative Examples 1 through 3 could not pass the combustion test for the flame resistant material in class 2 defined by JIS A-1321.

We claim:
1. A polyurethane-modified polyisocyanurate foam comprising a reaction product of a mixture containing
   (A) a polyisocyanate component consisting of at least one polyisocyanate compound;

(B) a polyol component containing at least one benzylic ether type phenolic resin of the formula (1):

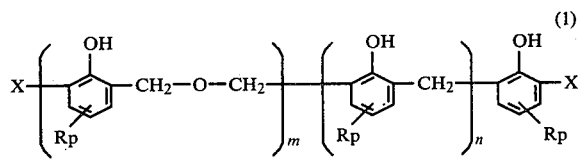

wherein R represents a member selected from the group consisting of a hydrogen atom, hydrocarbon radicals, oxyhydrocarbon radicals and halogen atoms; X represents a terminal group selected from the group consisting of a hydrogen atom and methylol radical, the molar ratio of the methylol terminal group to the hydrogen terminal group being at least 1; and m and n represent an integer, respectively, the sum of m and n being at least 2 and the ratio of m to n being at least 1, and p represents an integer from 1 to 3;

(C) a catalyst for trimerizing said polyisocyanate compound, and;

(D) a blowing agent, the ratio of the amount of isocyanate equivalent of said polyisocyanate component to the amount of hydroxyl equivalent of said polyol component, being in the range of from 1.5 to 10.

2. The product as claimed in claim 1, wherein the ratio of the amount of isocyanate equivalent of said polyisocyanate component to the amount of hydroxyl equivalent of said polyol component is in the range of from 3 to 7.

3. The product as claimed in claim 1, wherein said polyisocyanate compound is selected from the group consisting of aliphatic, cycloaliphatic and aromatic polyisocyanates and prepolymers of at least one of above-mentioned polyisocyanates with at least one hydorxyl compound.

4. The product as claimed in claim 1, wherein said polyol component consists of at least one benzylic ether type phenolic resin alone.

5. The product as claimed in claim 1, wherein said polyol component consists of at least 20% by weight of said benzylic ether type phonolic resin of the formula (1) and the balance consisting of at least one other polyol compound.

6. The product as claimed in claim 5, wherein said other polyol compound is selected from the group consisting of ethylene glycol, diethyleneglycol, neopentyl glycol, 1,4-butane-diol, 1,6-hexane diol, 1,4-cyclohexane dimethanol, glycerol, trimethylol propane, tris (2-hydroxyethyl) isocyanurate, pentaerythritol, polyesterpolyols and polyetherpolyols derived from the above-mentioned compounds, and addition products of aromatic polyamines or bis-phenol A with alkylene oxides.

7. The product as claimed in claim 1, wherein said trimerization catalyst consists of at least one member selected from the group consisting of alkali salts of aliphatic, cycloaliphatic and aromatic carboxylic acids, 2,4,6-tris(dimethylaminomethyl)phenol, N,N',N''-tris(-dimethylaminopropyl)hexahydrotriazine and diaza-bicycloalkene.

8. The product as claimed in claim 1, wherein said trimerization catalyst is used in an amount of from 0.1 to 10% based on the sum of the weights of said polyisocyanate component and said polyol component.

9. The product as claimed in claim 1, wherein said reaction mixture additionally contains a reaction promotor consisting of dibutyl-tin-dilaurate.

10. The product as claimed in claim 1, wherein said blowing agent consists of at least one member selected from the group consisting of trichloromonofluoromethane, dichlorodifluoromethane, and methylene chloride.

11. The product as claimed in claim 1, wherein said blowing agent contains water.

12. The product as claimed in claim 1, wherein said reaction mixture additionally contains a surfactant consisting of at least one member selected from the group consisting of polydimethylsiloxane-polyalkyleneoxide block polymers and vinylsilane-polyoxyalkylene polyol copolymers.

13. The product as claimed in claim 12, wherein said surfactant is used in an amount of from 0.2 to 5% based on the sum of the weights of said polyisocyanate component and said polyol component.

14. A method for producing a polyurethane-modified polyisocyanurate foam, comprising the steps of:
(1) Uniformly mixing:
  (B) a polyol component containing at least one benzylic ether type phenolic resin of the formula (1):

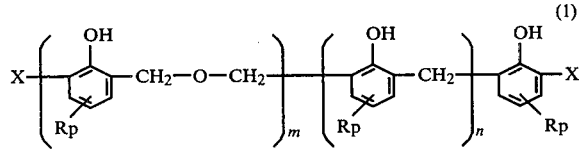

wherein R represents a member selected from the group consisting of a hydrogen atom, hydrocarbon radicals, oxyhydrocarbon radicals and halogen atoms; X represents a terminal group selected from the group consisting of a hydrogen atom and methylol radical, the molar ratio of the methylol terminal group to the hydrogen terminal group being at least 1; and m and n represent an integer, respectively, the sum of m and n being at least 2 and the ratio of m to n being at least 1, and p represents an integer from 1 to 3;
  (C) a catalyst for trimerizing said polyisocyanate compound, and;
  (D) a blowing agent, the ratio of the amount of isocyanate equivalent of said polyisocyanate component to the amount of hydroxyl equivalent of said polyol component, being in the range of from 1.5 to 10;
(2) admixing said mixture with (A) a polyisocyanate component consisting of at least one polyisocyanate compound while vigorously stirring the admixture at an ambient temperature, to prepare a creamy admixture, and,
(3) leaving said creamy admixture to stand at a predetermined temperature without stirring it, to cause said creamy admixture to be foamed in two foaming steps and, then, solidified.

* * * * *

UNITED STATES PATENT AND TRADEMARK OFFICE
CERTIFICATE OF CORRECTION

PATENT NO. : 4,345,042

DATED : August 17, 1982

INVENTOR(S) : Akira Kuroda et al

It is certified that error appears in the above-identified patent and that said Letters Patent is hereby corrected as shown below:

```
In the Abstract, the last line "t" should be --to--
Column 2, line 59, "isocyanato" should be --isocyanate--
Column 4, line 35, "isocyanato" should be --isocyanate--
Column 5, line 57, "0" should be deleted
Column 9, line 1, "second" should be --seconds--
Column 9, line 16, "line" should be --time--
Column 10, line 8, "stonfur" should be --Stonfur--
Column 11, line 37, "hydorxyl" should be --hydroxyl--
Column 11, line 44, "phonolic" should be --phenolic--
```

Signed and Sealed this

Ninth Day of August 1983

[SEAL]

Attest:

GERALD J. MOSSINGHOFF

Attesting Officer

Commissioner of Patents and Trademarks